United States Patent [19]

Yu et al.

[11] Patent Number: 5,034,656
[45] Date of Patent: Jul. 23, 1991

[54] TUNGSTEN HALOGEN LAMP INCLUDING PHOSPHOROUS AND BROMINE

[75] Inventors: Thomas H. Yu, Richmond Heights; Ronald J. Olwert, Concord Township, Lake County; Rolf S. Bergman, Cleveland Heights, all of Ohio

[73] Assignee: General Electric Company, Schenectady, N.Y.

[21] Appl. No.: 412,700

[22] Filed: Sep. 26, 1989

[51] Int. Cl.$^5$ ............................................. H01K 1/50
[52] U.S. Cl. .................................................. 313/579
[58] Field of Search .......................................... 313/579

[56] References Cited

U.S. PATENT DOCUMENTS

| | | |
|---|---|---|
| 3,712,701 | 1/1973 | Johnston et al. . |
| 3,800,180 | 3/1974 | De Fraeye et al. . |
| 4,629,935 | 12/1986 | Keenan ................................ 313/579 |
| 4,629,936 | 12/1986 | Weld et al. ........................... 313/579 |
| 4,727,286 | 2/1988 | Keenan et al. .................. 313/579 X |
| 4,748,376 | 5/1988 | Weld et al. ........................... 313/579 |

OTHER PUBLICATIONS

"Designers Handbook, Light Source Applications" by J. F. Waymouth et al., GTE Products Corp., 12/1980, pp. 15 and 16.

Primary Examiner—Palmer C. DeMeo
Attorney, Agent, or Firm—Edward M. Corcoran; Stanley C. Corwin; Fred Jacob

[57] ABSTRACT

Tungsten-halogen lamps operating at temperatures above 250° C. which contain a mixture of phosphine, hydrogen, bromine and inert gas have been found to have superior life and lumen maintenance when the atomic ratio of phosphorus to bromine in the lamp is in the range of from 0.4–2.5.

40 Claims, 2 Drawing Sheets

TUNGSTEN HALOGEN LAMP INCLUDING PHOSPHOROUS AND BROMINE

BACKGROUND OF THE INVENTION

1. Field of the Invention

This invention relates to a fill suitable for use with tungsten halogen lamps and lamps using same. More particularly, this invention relates to a tungsten halogen lamp operating at a temperature greater than 250° C. and having improved life which comprises a hermetically sealed, light transmissive, vitreous envelope containing a tungsten filament and a mixture of inert gas, hydrogen, phosphorus and bromine wherein atomic ratio of phosphorus to bromine ranges from 0.4–2.5.

2. Background of the Disclosure

Tungsten halogen lamps which comprise a hermetically sealed vitreous, light transmissive envelope enclosing a tungsten filament and containing a fill comprising a halogen gas are well known to those skilled in the art. These lamps operate on a tungsten-halogen cycle which is a regenerative, continuous process in which a halogen containing tungsten compound is produced when the halide combines chemically with particles of tungsten evaporating from an incandescent tungsten filament. Subsequent thermal decomposition of these so formed halogen containing tungsten compounds at the filament returns the tungsten particles back to the filament. For the most part, one or more bromine compounds are used for the halide fill in such lamps along with an inert gas, such as argon. Phosphorus or phosphorus compounds which act as oxygen getters are also employed in the fill. Bromine compounds known to be useful for such fills include hydrogen bromide HBr, methyl bromide $CH_3Br$, dibromomethane $CH_2Br_2$ and bromoform $CHBr_3$. Thus, U.S. Pat. No. 3,712,701 discloses the use of hydrogen bromide as well as these bromine containing single carbon atom hydrocarbon compounds. This patent also discloses the use of phosphonitrilic bromides. U.S. Pat. No. 4,629,935 discloses a fill consisting of a mixture of phosphine and methyl bromide wherein the mass ratio of the carbon to the phosphorus in the fill resulting from such compounds ranges from about 4/1 to about 1/1. It is also known that the use of carbon containing compounds in tungsten-halogen lamps can result in the tungsten filament becoming brittle due to the presence of the carbon in the lamp. This embrittlement becomes particularly significant in filaments made of fine tungsten wire having a diameter of less than 0.005 inches and U.S. Pat. No. 4,629,936 suggests various ratios of phosphorus compounds to carbon containing compounds, along with the presence of yellow phosphorus in the lamp, as a possible solution to this problem. The example in this patent employed a mixture of methyl bromide and phosphine, but the amounts of these materials used in the example are not given. The preferred phosphine to methyl bromide mass ratio was said to be from 30/1 to 1/1.

U.S. Pat. No. 4,748,376 discloses that additional problems occur with tungsten halogen lamps when the lamps operate at relatively cool temperatures such that the interior wall surface of the vitreous envelope is less than 200° C. The operation of lamps at these low temperatures is disclosed in this patent as resulting in premature blackening of the glass envelope. Such blackening is believed to be from tungsten transfer from the filament onto the inner envelope surface due to failure of the tungsten cycle. This problem is overcome by using a fill in the envelope which includes bromine, phosphorus, carbon and an inert gas, with a phosphorus to carbon mass ratio in the range of approximately 10/1 to 1/1. Phosphine, methyl bromide, dibromomethane, bromoform and cyanogen ($C_2N_2$) are disclosed as being suitable as components of the lamp fill. This patent also discloses that adding too much phosphine to the fill also results in lamp darkening.

SUMMARY OF THE INVENTION

The present invention relates to a tungsten halogen lamp operating at a temperature greater than 250° C. and containing inert gas, hydrogen, phosphorus and bromine wherein the atomic ratio of phosphorus to bromine ranges from 0.4–2.5. Thus, the present invention relates to a tungsten-halogen lamp comprising a hermetically sealed, light transmissive, vitreous envelope containing a tungsten filament, and a fill of inert gas, hydrogen, phosphorus, and bromine wherein the atomic ratio of phosphorus to bromine ranges from 0.4–2.5. In a preferred embodiment the source of phosphorus and bromine will be phosphine and methyl bromide ($CH_3Br$). The vitreous envelope may be made of a suitable high temperature type of aluminosilicate glass or quartz (vitreous silica). By relatively elevated temperature is meant that the wall temperature of the vitreous envelope enclosing the filament will be greater than 250° C. In general, the temperature will range from about 300° C. up to as much as 900° C. in the case of a lamp having a quartz envelope and up to about 700° C. for a lamp having a glass envelope, with temperatures of from about 350°–600° C. being typical for lamps with glass envelopes and temperatures of from about 700°–800° C. fairly typical for lamps with quartz envelopes.

DETAILED DESCRIPTION

Figure 1:
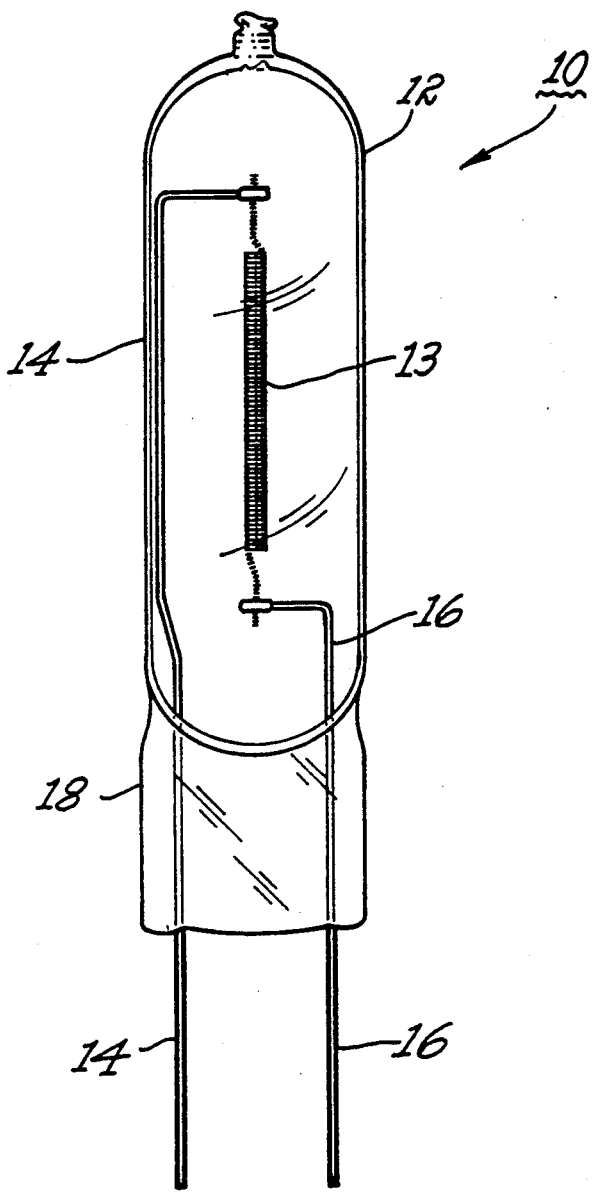
FIG. 1 is a schematic drawing of a tungsten-halogen lamp useful in the practice of the present invention wherein the lamp envelope is made of a high temperature glass.

FIG. 1 illustrates one particular design of a commercially available, single ended, tungsten-halogen lamp suitable for use in practicing the present invention. Other tungsten-halogen lamp types may also be used in the practice of the invention which are well known to those skilled in the art and include, as illustrative but non-limiting examples, single ended and double ended lamps having quartz envelopes which employ molybdenum foil to achieve a hermetic seal. Accordingly, the scope of the invention is not intended to be limited to the particular lamp shown in FIG. 1 and described below.

Referring to FIG. 1, lamp 10 has a tubular, light transmissive vitreous envelope 12 formed from a high temperature aluminosilicate glass of the type disclosed and claimed in U.S. Pat. No. 4,737,685 the disclosures of which are incorporated herein by reference. A tungsten filament 13 is connected to and supported within said vitreous envelope by inlead wires 14 and 16 made of molybdenum and which extend through a customary pinch seal 18. If desired, molybdenum inleads 14 and 16 can be connected by means of welding, brazing or other suitable means to less costly metals of a greater or the same diameter to provide electrical connection for the filament and also support for the lamp. Envelope 12 also contains a fill of a mixture of inert gas, carbon, hydrogen, phosphorus and bromine, wherein the mole ratio of phosphorus to bromine ranges from about 0.4–2.5 Lamps of this type generally operate at a glass envelope wall temperature of from about 300°–600° C.

It is essential to the practice of the invention that the lamp contain inert gas, hydrogen, phosphorus and bromine wherein the atomic ratio of the phosphorus to bromine is in the range of 0.4–2.5. The source of the bromine may be bromine gas, hydrogen bromide, HBr, or hydrocarbon compounds such as methyl bromide $CH_3Br$, dibromomethane $CH_2Br_2$, bromoform $CHBr_3$ and the like. Single carbon atom hydrocarbons are preferred and methyl bromide is particularly preferred. As a practical matter, toxicity and corrosion problems can occur in production with the use of $Br_2$ and HBr. The phosphorus may be added in the form of yellow or red elemental phosphorus or in the form of a phosphorus containing compound such as phosphine $PH_3$ and phosphorus nitride $P_3N_5$. Thus, yellow or red phosphorus may be introduced directly into the interior of the lamp envelope or a suitable phosphorus containing compound such as phosphine or phosphorus nitride may be added. Thus, in one embodiment the source of phosphorus in the lamp will be selected from the group consisting essentially of elemental phosphorus, phosphine, phosphorus nitride or mixture thereof. Phosphine is particularly preferred because it is a gas at room temperature and pressure and can be accurately mixed and diluted with an inert gas and the mixture introduced into the lamp envelope. The hydrogen in the lamp envelope may be introduced as part of the phosphine, HBr, bromine containing hydrocarbon or mixed with inert gas, depending on the lamp fill and method of manufacture. The choice will be determined by the practitioner. The preferred source of bromine in the lamp is $CH_3Br$.

In one method of lamp manufacture the phosphine is mixed with inert gas and this mixture, along with the brominated hydrocarbon, is introduced into the interior of the filament enclosing lamp envelope and the lamp is then sealed. In another method of lamp manufacture it has been found convenient to introduce a mixture of phosphine and inert gas into the lamp and energize the filament to crack the phosphine into phosphorus and hydrogen. The phosphorus coats the interior surface of the lamp envelope as elemental phosphorus. The inert gas and hydrogen are then removed and the remainder of the fill, including inert gas, and, i.e., methyl bromide and, if necessary, hydrogen, are then added. Thus, in this context a lamp according to the present invention will comprise a hermetically sealed light transmissive, vitreous envelope enclosing a tungsten filament within and containing a mixture of inert gas, hydrogen, phosphorus, bromine and carbon wherein said phosphorus in said lamp is obtained by cracking a phosphorus precursor within said envelope to produce said phosphorus and at least one by-product of said cracking, removing said by-product from within said envelope, and then introducing $CH_3Br$ and said inert gas into said envelope in the desired amounts and sealing said envelope, wherein the atomic ratio of said phosphorus to said bromine in said envelope ranges from 0.4 to 2.5.

The atomic ratio of phosphorus to bromine in the lamp is important to the present invention. In general, the atomic ratio of phosphorus to bromine will broadly range from about 0.4–2.5, preferably from about 0.5–2.5 moles of phosphorus per mole of bromine and still more preferably 1.0–2.5, depending on the type of lamp. That is, as discussed above, most tungsten-halogen lamps having quartz envelopes are designed to operate at higher temperatures than lamps having envelopes made of high temperature glass and the phosphorus to bromine atomic ratio for such quartz lamps will be at least 0.45 under this invention. Those skilled in the art know that by atomic ratio is meant the ratio of atoms which, in this example, is the ratio of the number of phosphorus atoms to bromine atoms. The presence of hydrogen in the lamp envelope has been found to be necessary to stabilize the bromine and prevent it from reacting with the tungsten filament and the inner leads. Accordingly, there should be at least about one atom of hydrogen present for each atom of bromine in the lamp. A preferred range for the atomic ratio of hydrogen to bromine in the lamp will be from about 1/1 to about 3/1.

As set forth above the lamp must also contain inert gas. By inert gas is meant one or more noble gases and, in high voltage lamps, a mixture of one or more noble gases with a gas which prevents arcing of the filament. Lamp fills containing only one or more noble gases as the inert gas are satisfactory with relatively low voltage lamps (i.e., 12 V) and lamps in which the filaments are not tightly wound. However, in relatively high voltage lamps (i.e., 120 V or more) and in lamps in which the filament is tightly wound having relatively small turn-to-turn distances (i.e, 0.2–1.5 millimeters), the voltage drop from turn-to-turn is high and a gas which aids to prevent arcing between filament turns is necessary. Filament arcing and arc-out is well known in the lamp industry and results in one or more sections of the filament opening due to tungsten erosion from the arc, with the result that the lamp becomes inoperative due to the open circuit resulting from the filament burn out. Nitrogen has been found to be an effective gas for use in the present invention to prevent filament arcing. Accordingly, it has been found that, depending on lamp type, the amount of nitrogen in the fill can range from about 0–100 volume % of the total fill. By way of an illustrative, but non-limiting example, projector lamps which run very hot and tightly wound double coiled filament lamps operating at voltages in the order of 240 V often have 100% nitrogen as the inert gas. Correspondingly, the amount of noble gas in the fill may range from about 0 to 100%. Noble gases generally used in tungsten halogen lamps include xenon, krypton, and argon, with xenon being most preferred, followed by krypton and then argon.

The invention will be further understood by reference to the example below:

EXAMPLE

Figure 2:
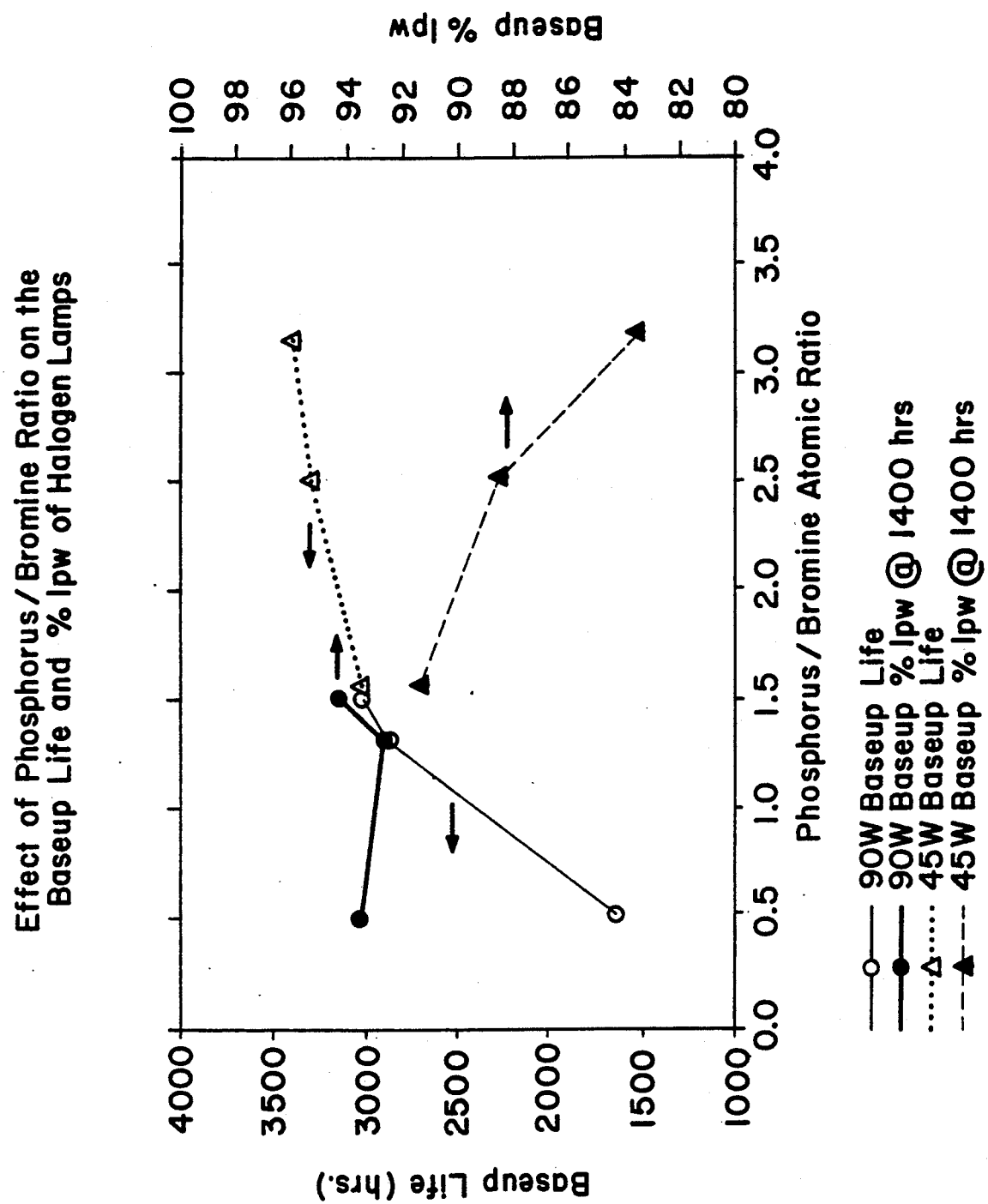
FIG. 2 is a graph illustrating lamp life and efficacy as a function of the phosphorus to bromine atomic ratio in lamps according to the invention.

Ten 90 watt and ten 45 watt, 120 volt, single ended tungsten-halogen lamps of the type illustrated in FIG. 1 having high temperature aluminosilicate glass envelopes were prepared at various phosphorus to halogen atomic ratios by filling the lamp with a fill gas consisting of a mixture of phosphine and methyl bromide in an inert gas prior to sealing the lamp. More particularly, for the 90 watt lamps the inert gas was a mixture of 5 volume percent nitrogen and 95 volume percent krypton which contained phosphine and 0.05 volume percent methyl bromide (CH$_3$Br). The amount of phosphine (PH$_3$) employed in the fill gas ranged from 0.025-0.07 volume percent in order to vary the phosphorus to bromine atomic ratio. For the 45 watt lamps the inert gas was a mixture of 95 volume percent xenon and 5 volume percent nitrogen which contained phosphine and 0.025 volume percent methyl bromide. The amount of phosphine employed in the fill gas into the lamp ranged from 0.03-0.072 volume percent. The cold fill pressure of both types of lamps was 4,000 torr. In these types of lamps the optimum mass ratio of phosphorus to carbon was found to range from 1.2 to 6.5. The wall temperature of the glass envelope of the 45 watt lamps was about 350° C., whereas the wall temperature of the 90 watt lamps was about 550° C. The percent lumens per watt as a function of the phosphorus to bromine atomic ratio after 1400 hours of burning for both lamps is plotted in FIG. 2, along with the lamp life in hours. Lamp life is defined as the time to burn-out. Each point in FIG. 2 is an average of a ten (10) lamp samples. One immediately sees the sharp fall-off in lamp life as the atomic ratio of phosphorus to bromine falls below about 1 and a corresponding drop in lamp efficacy when the ratio exceeds 2.5.

What is claimed is:

1. A tungsten-halogen lamp comprising a hermetically sealed, light transmissive, envelope enclosing a tungsten filament and containing a mixture of inert gas, hydrogen, phosphorus and bromine wherein the atomic ratio of said phosphorus to said bromine ranges from about 0.4-2.5 and wherein the atomic ratio of said hydrogen to said bromine is at least about 1/1.

2. The lamp of claim 1 wherein said envelope is a vitreous envelope.

3. The lamp of claim 2 wherein said inert gas is selected from the group consisting essentially of nitrogen, noble gas and mixture thereof.

4. The lamp of claim 3 wherein said noble gas is selected from the group consisting essentially of xenon, argon, krypton and mixture thereof.

5. The lamp of claim 4 wherein said atomic ratio of phosphorus to bromine is at least 0.45.

6. The lamp of claim 5 wherein said atomic ratio of phosphorus to bromine is at least 0.5.

7. The lamp of claim 6 wherein said atomic ratio of phosphorus to bromine is at least about 1.0.

8. A tungsten-halogen lamp for operating at a temperature above 250° C. and comprising a hermetically sealed light transmissive, vitreous envelope made of quartz or a high temperature glass enclosing a tungsten filament and containing a mixture of inert gas, hydrogen, phosphorus and bromine wherein the atomic ratio of said phosphorus to said bromine ranges from about 0.4-2.5 and wherein the atomic ratio of said hydrogen to said bromine is at least one.

9. The lamp of claim 8 wherein said inert gas is selected from the group consisting essentially of nitrogen, noble gas and mixture thereof.

10. The lamp of claim 9 wherein said noble gas is selected from the group consisting essentially of xenon, argon, krypton and mixture thereof.

11. The lamp of claim 10 wherein said atomic ratio of phosphorus to bromine is at least 0.45.

12. The lamp of claim 10 wherein said ratio of phosphorus to bromine is at least about 0.5.

13. The lamp of claim 10 wherein said ratio of said phosphorus to said bromine is at least about 1.0.

14. A lamp comprising a hermetically sealed, light transmissive envelope enclosing a tungsten filament within and containing a mixture of inert gas, hydrogen, phosphorus, bromine and carbon wherein the source of said phosphorus in said lamp is selected from the group consisting essentially of elemental phosphorus, PH$_3$, P$_3$N$_5$ and mixture thereof and said bromine source comprises CH$_3$Br and wherein the atomic ratio of said phosphorus to said bromine in said lamp ranges from 0.4 to 2.5 and the atomic ratio of said hydrogen to said bromine is at least one.

15. A lamp comprising a hermetically sealed light transmissive, vitreous envelope enclosing a tungsten filament within and containing a mixture of inert gas, hydrogen, phosphorus, bromine and carbon wherein said phosphorus in said lamp is obtained by cracking a phosphorus precursor within said envelope to produce said phosphorus and at least one by-product of said cracking, removing said by-product from within said envelope, and then introducing CH$_3$Br and said inert gas into said envelope in the desired amounts and sealing said envelope, wherein the atomic ratio of said phosphorus to said bromine in said envelope ranges from 0.4 to 2.5 and the atomic ratio of said hydrogen to said bromine is at least three.

16. The lamp of claim 14 wherein said inert gas comprises one or more noble gases.

17. The lamp of claim 16 wherein said noble gas is selected from the group consisting essentially of xenon, argon, krypton and mixture thereof.

18. The lamp of claim 17 wherein said inert gas includes nitrogen.

19. The lamp of claim 18 wherein said phosphorus to bromine ratio is at least 0.45.

20. The lamp of claim 19 wherein said phosphorus to bromine ratio is at least about 0.5.

21. The lamp of claim 20 wherein said phosphorus to bromine ratio is at least about 1.0.

22. The lamp of claim 15 wherein said inert gas comprises one or more noble gases.

23. The lamp of claim 22 wherein said noble gas is selected from the group consisting essentially of xenon, argon, krypton and mixture thereof.

24. The lamp of claim 23 wherein said inert gas includes nitrogen.

25. The lamp of claim 24 wherein said phosphorus to bromine ratio is at least 0.45.

26. The lamp of claim 25 wherein said phosphorus to bromine ratio is at least about 0.5.

27. The lamp of claim 26 wherein said phosphorus to bromine ratio is at least about 1.0.

28. The lamp of claim 15 wherein said inert gas comprises one or more noble gases.

29. The lamp of claim 28 wherein said noble gas is selected from the group consisting essentially of xenon, argon, krypton and mixture thereof.

30. The lamp of claim 29 wherein said inert gas includes nitrogen.

31. The lamp of claim 30 wherein said phosphorus to bromine ratio is at least 0.45.

32. The lamp of claim 31 wherein said phosphorus to bromine ratio is at least about 0.5.

33. The lamp of claim 32 wherein said phosphorus to bromine ratio is at least about 1.0.

34. A lamp comprising a hermetically sealed, light transmissive, vitreous envelope enclosing a tungsten filament within and containing a mixture of inert gas, hydrogen, phosphorus, bromine and carbon wherein the atomic ratio of said phosphorus to said bromine ranges from about 0.4–2.5 and wherein the atomic ratio of said hydrogen to said bromine is greater than 3.0.

35. The lamp of claim 34 wherein inert gas comprises one or more noble gases.

36. The lamp of claim 25 wherein said noble gas is selected from the group consisting essentially of xenon, argon, krypton and mixture thereof.

37. The lamp of claim 36 wherein said inert gas includes nitrogen.

38. The lamp of claim 37 wherein said phosphorus to bromine atomic ratio is at least 0.45.

39. The lamp of claim 38 wherein said phosphorus to bromine ratio is at least 0.5.

40. The lamp of claim 39 wherein said phosphorus to bromine ratio is at least about 1.0.

* * * * *